United States Patent Office 2,927,346
Patented Mar. 8, 1960

2,927,346

METHOD OF MAKING AN INK-CARRIER ROLLER

Edward D. Hill, Cleveland, Ohio

Application April 16, 1954, Serial No. 423,818

4 Claims. (Cl. 18—58)

Ink-carrying rollers for the printing industry have been largely of the glue-glycerin type for soft-bodied rollers, and rubber has been used to quite an extent where a more firm roller is desired, such as for particularly drastic usage. Rubber has certain handicaps which involve complications in manufacture of rollers and involve considerable cost. Customarily the rubber is milled out to desired thickness in view of the roller to be made up, and is wound upon a support shaft and is vulcanized. The material in vulcanization changes in surface such that it requires a final truing by face-grinding. To obtain the necessary trueness of surface, this involved a very particular operation; and even at the best the affinity of a rubber roller for ink is not all that could be desired as regards pick-up and ink-carrier function. Furthermore, rubber rollers are susceptible to action of constituents in certain present-day inks, and their range of utility is correspondingly limited. By the present invention a firm type of roller may be had, superior to rubber rollers, and having the further advantages of being free from the inherent drawbacks of rubber, and being adapted for printing and lithographic presses, including the body of fountain rollers carrying a facing sleeve of any desired character. Other objects and advantages will appear from the following description.

To the accomplishment of the foregoing and related ends, said invention, then, comprises the features hereinafter fully described and particularly pointed out in the claims, the following description setting forth in detail certain illustrative embodiments of the invention, these being indicative, however, of but a few of the various ways in which the principle of the invention may be employed.

For preparing rollers according to the invention, a composition of polyvinyl resin is made up including a butadiene-acrylonitrile or so-called nitrile rubber. The resin may be of polyvinyl chloride, copolymers including polyvinyl acetate, vinylidene, and the like, the resin being primarily in finely divided or powder form, and the nitrile rubber as a low polymer, a liquid, is admixed therewith. Such a cold-mixed material may be stocked until to be molded. In the composition mixture there is also included a small amount of an oxide such as titanium dioxide, zinc oxide, or the like, and a small amount of a heat stabilizing agent such as basic lead carbonate and a small amount of a sulphur-providing agent, such as pulverulent sulphur. This, with the polyvinyl resin powder such as of 300 mesh fineness, in amount of 100 parts by weight is made up with 50–500 parts of liquid nitrile rubber, the amount depending on the softness desired for the final roller. Small amounts of resin plasticizer types may also be included for added softness if desired, and there are also included 2–10 parts of metal oxide of the class consisting of titanium dioxide and zinc oxide, and 2–10 parts of sulphur per each 100 parts of nitrile rubber.

For molding into final form, the composition is heated, and in liquid form is poured into a conventional roller casting mold which can center the support shaft. In heating range of 200° F. to 250° F. the liquid material can be readily poured and cast, as below this temperature the vinyl resin is not affected, but above 250° F. thickening sets in which would deter pouring. By then further heating up to 350–400° F., for 25–35 minutes, depending upon the size of the roller, the vinyl compounds complete their reaction and when cooled to ordinary temperature the roller as removed from the mold presents a fine smooth surface. Such rollers will stand temperatures up to 500° F. without softening, and this is a very desirable property when heated inks and coatings are employed in connection with the functioning of the roller. For especially smooth mold surfaces, chromium plating may be provided in cases where desired.

For introduction of the nitrile rubber component of the composition, in some cases the commercial material "Hycar" 1012X41, a liquid low-molecular cyanide polymer specifically of butadiene-acrylonitrile may be used, the other component, primarily butadiene, not being detrimental for most usages.

As an example: Polyvinyl chloride resin, 300 mesh, in amount of 100 parts by weight is mixed with 50–500 parts of butadiene-acrylonitrile in low-molecular liquid form, and 10 parts each of titanium dioxide and sulphur. The mixture is heated to 200–250° F. and poured into the roller mold, and with the temperature raised to 350–400° F. the heating is continued for 30 minutes, and after cooling the roller is removed from the mold.

Using a mold having centering for the shaft this roller requires no grinding or truing finishing. And no end trimming is required, as the centering plates at top and bottom provide the exact length.

In some cases, and where a particularly firm roller is desired, the composition may be made up of butadiene-acrylonitrile in low-molecular liquid form, and 2–10 parts of an oxide such as titanium dioxide, zinc oxide or the like, and 2–10 parts of a heat stabilizer such as basic lead carbonate, and 2–10 parts of sulphur, per each 100 parts by weight of the polyvinyl cyanide. This liquid composition is then poured into a roller mold equipped with centering supports, and is heated to a temperature of 350–400° F. for 25–35 minutes, depending upon the size of the roller. A roller so produced is of particularly smooth surface and requires no further treatment.

Other modes of applying the principle of the invention may be employed, change being made as regards the details described, provided the features stated in any of the following claims or the equivalent of such be employed.

I therefore particularly point out and distinctly claim as my invention:

1. A method of directly preparing a finished printing or lithographic roller having a smooth peripheral surface and desired dimensions and thereby eliminating trimming and truing of the roller after the molding thereof, comprising the steps of admixing a polyvinyl chloride resin with a low polymer liquid butadiene-acrylonitrile to promote thorough mixing, heating the mixture within the range of about 200° F. to 250° F. to a fluid state without appreciably softening the polyvinyl resin, casting the heated mixture into a roller mold, and then heating the mixture while confined in the mold in the range of about 250° F. to 400° F. to a final set.

2. A method of directly preparing a finished printing or lithographic roller having a smooth peripheral surface and desired dimensions and thereby eliminating trimming and truing of the roller after the molding thereof, comprising the steps of admixing from an ambient temperature to about 250° F. a polyvinyl chloride resin with a low polymer liquid butadiene-acrylonitrile to promote thorough mixing, maintaining the mixture within the range of about 200° F. to 250° F. to convert it to a fluid state without appreciably softening the polyvinyl resin, casting the heated mixture into a roller mold, and then heating the mixture while confined in the mold in the range of about 250° F. to 400° F. to a final set.

3. A method of directly preparing a finished printing or lithographic roller having a smooth peripheral surface and desired dimensions and thereby eliminating trimming and truing of the roller after the molding thereof, comprising the steps of admixing from an ambient temperature to about 250° F. about 100 parts by weight of polyvinyl chloride resin with about 50 to 500 parts by weight of a low polymer liquid butadiene-acrylonitrile to promote thorough mixing, maintaining the mixture within the range of about 200° F. to 250° F. to convert it to a fluid state without appreciably softening the polyvinyl resin, casting the heated mixture into a roller mold, and then heating the mixture while confined in the mold in the range of about 250° F. to 400° F. to a final set.

4. A method of directly preparing a finished printing or lithographic roller having a smooth peripheral surface and desired dimensions and thereby eliminating trimming and truing of the roller after the molding thereof, comprising the steps of admixing from an ambient temperature to about 250° F. about 100 parts by weight of polyvinyl chloride resin, 50 to 500 parts by weight of a low polymer liquid butadiene-acrylonitrile to promote thorough mixing, 10 parts of a metal oxide selected from the class consisting of titanium dioxide and zinc oxide for each 100 parts of the butadiene-acrylonitrile polymer, and 2 to 10 parts of sulfur for each 100 parts of the butadiene-acrylonitrile polymer, maintaining the mixture within the range of about 200° F. to 250° F. to convert it to a fluid state without appreciably softening the polyvinyl resin, casting the heated mixture into a roller mold, and then heating the mixture while confined in the mold in the range of about 250° to 400° F. to a final set.

References Cited in the file of this patent

UNITED STATES PATENTS

| | | |
|---|---|---|
| 2,446,984 | Rogers et al. | Aug. 10, 1948 |
| 2,457,035 | Darby | Dec. 21, 1948 |
| 2,536,323 | Spencer | Jan. 2, 1951 |
| 2,552,904 | Newberg et al. | May 15, 1951 |

OTHER REFERENCES

"Modern Plastics Encyclopedia" for 1948, published by Plastics Catalogue Corp., N.Y. 17, N.Y., page 1641.